United States Patent
Lai (10) Patent No.: US 8,149,207 B2
(45) Date of Patent: Apr. 3, 2012

(54) TOUCH SIGNAL TRANSMISSION CIRCUIT FOR TOUCH LCD

(75) Inventor: Hui-Lung Lai, Southern Taiwan Science Park (TW)

(73) Assignee: Chi Hsin Electronics Corp., Southern Taiwan Science Park (TW)

( * ) Notice: Subject to any disclaimer, the term of this patent is extended or adjusted under 35 U.S.C. 154(b) by 937 days.

(21) Appl. No.: 12/216,634

(22) Filed: Jul. 9, 2008

(65) Prior Publication Data

US 2010/0007626 A1      Jan. 14, 2010

(51) Int. Cl.
*G09G 3/36* (2006.01)

(52) U.S. Cl. ..... 345/104; 345/173; 345/174; 178/18.01; 178/18.03; 178/18.05; 178/18.06

(58) Field of Classification Search .... 178/18.01–18.11; 345/156, 173–184, 104; 382/312–314; 463/37
See application file for complete search history.

(56) References Cited

U.S. PATENT DOCUMENTS

| | | | | |
|---|---|---|---|---|
| 4,578,654 A | * | 3/1986 | Tait | 333/175 |
| 4,733,222 A | * | 3/1988 | Evans | 341/33 |
| 6,297,811 B1 | * | 10/2001 | Kent et al. | 345/173 |
| 7,202,859 B1 | * | 4/2007 | Speck et al. | 345/174 |
| 2001/0040554 A1 | * | 11/2001 | Nakagawa | 345/160 |
| 2007/0008299 A1 | * | 1/2007 | Hristov | 345/173 |
| 2008/0231607 A1 | * | 9/2008 | Utsunomiya et al. | 345/173 |
| 2009/0194344 A1 | * | 8/2009 | Harley et al. | 178/18.06 |

* cited by examiner

*Primary Examiner* — Lun-Yi Lao
*Assistant Examiner* — Priyank Shah
(74) *Attorney, Agent, or Firm* — Bacon & Thomas, PLLC (57) ABSTRACT

A touch signal transmission circuit for a touch control LCD is mounted to an inner side of an upper substrate of the LCD, having a first patterned electrode layer and a second patterned electrode layer, which are electrically insulated from each other and partially overlap each other in intervals to define a touch control section. Each of the first and second patterned electrode layers includes a plurality of electrodes in the shape of footsteps. The electrodes are interlaced with one another, having some parts overlapping and right corresponding to each other to define a plurality of touch-sensitive points. In this way, only fewer footstep-shaped electrodes are needed to cover the whole touch control section to decrease the number of bonding pads and pins of a touch control IC. Besides, a lot of touch sensitive points are closely disposed in the touch control section to keep quick detection and decoding.

8 Claims, 8 Drawing Sheets

TOUCH SIGNAL TRANSMISSION CIRCUIT FOR TOUCH LCD

BACKGROUND OF THE INVENTION

1. Field of the Invention

The present invention relates generally to control structure of a liquid crystal display (LCD), and more particularly, to a touch signal transmission circuit for a touch control LCD.

2. Description of the Related Art

A general touch control display is composed of a touch control panel and a flat display, which overlap each other. However, such touch control display is subject to increased thickness and weight to be against the dominant trend of being compact for electronic products. Therefore, manufacturers in the relevant industry not only look for the optimal display effect but also devote themselves to developing the thinned and lightened displays.

As for the capacitive-type touch control panel, it is still an individual structure independent from the flat display and it is essentially composed of a first electrode layer and a second electrode layer, which are electrically insulated from each other. The capacitive-type touch control panel must have multiple touch points to more precisely locate where a user or an object touches, such that the first and second electrode layers are composed of a plurality of straight electrodes arranged closely. The straight-line electrodes of the first electrode layer are interlaced with those of the second electrode layer, such that where they are interlaced define touch points. Each of the straight-line electrodes is electrically connected with a bonding pad and then the bonding pads are electrically connected with pins of a touch control IC respectively. In this way, the touch positions can be located more accurately while the display is operated. However, if the touch points need more, the bonding pads and the pins of the touch control IC will also need more, such that the production will be more difficult and the whole weight will be indirectly increased to incur more production costs. For this reason, without deteriorating the function of locating the touch positions, simplifying the touch control structure for more compact design can improve the prior art as the present invention does.

SUMMARY OF THE INVENTION

The primary objective of the present invention is to provide a touch signal transmission circuit, which decreases the number of bonding pads.

The secondary objective of the present invention is to provide a touch signal transmission circuit, which is mounted to an inner side of an upper substrate of an LCD for reduction of overall thickness and weight.

The foregoing objectives of the present invention are attained by the touch signal transmission circuit composed of a first patterned electrode layer and a second patterned electrode layer. The first patterned electrode layer includes a plurality of first electrodes arranged in apposition. The first electrodes are shaped like footsteps extending toward one slope direction. Each of the first electrodes has an upper contact point defined at each of the turnings of the footsteps. The second patterned electrode layer is formed above the first patterned electrode layer by electric insulation therebetween, having a plurality of second electrodes arranged in apposition. The second electrodes are also shaped like footsteps extending toward the same slope direction as the first electrodes do. Each of the second electrodes does not overlap the first electrode. Each of the second electrodes has a lower contact point defined at each of turnings of the footsteps and right corresponding to the upper contact point.

DETAILED DESCRIPTION OF PREFERRED EMBODIMENTS

Figure 1:
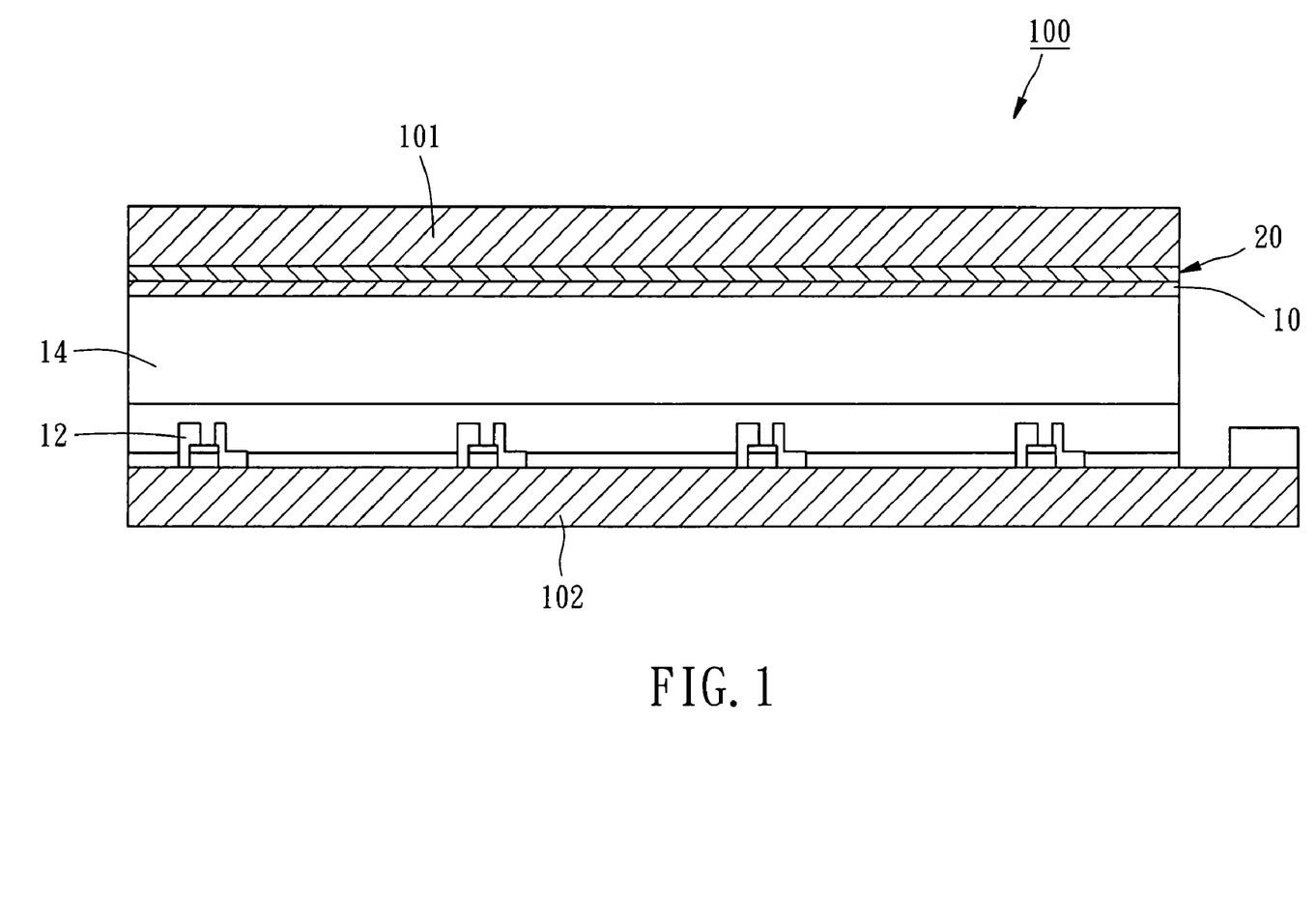
FIG. 1 is a sectional view of a touch control display having a touch signal transmission circuit of a preferred embodiment of the present invention.

Referring to FIG. 1, a touch control display 100 having a touch signal transmission circuit 20 of a preferred embodiment of the present invention is composed of an upper substrate 101 and a lower substrate 102. The upper substrate 101 includes a color filter 10. The lower substrate 102 includes a plurality of film transistors 12 arranged on array on a surface thereof. Liquid crystals 14 are filled between the upper and lower substrates 101 and 102.

Figure 6:
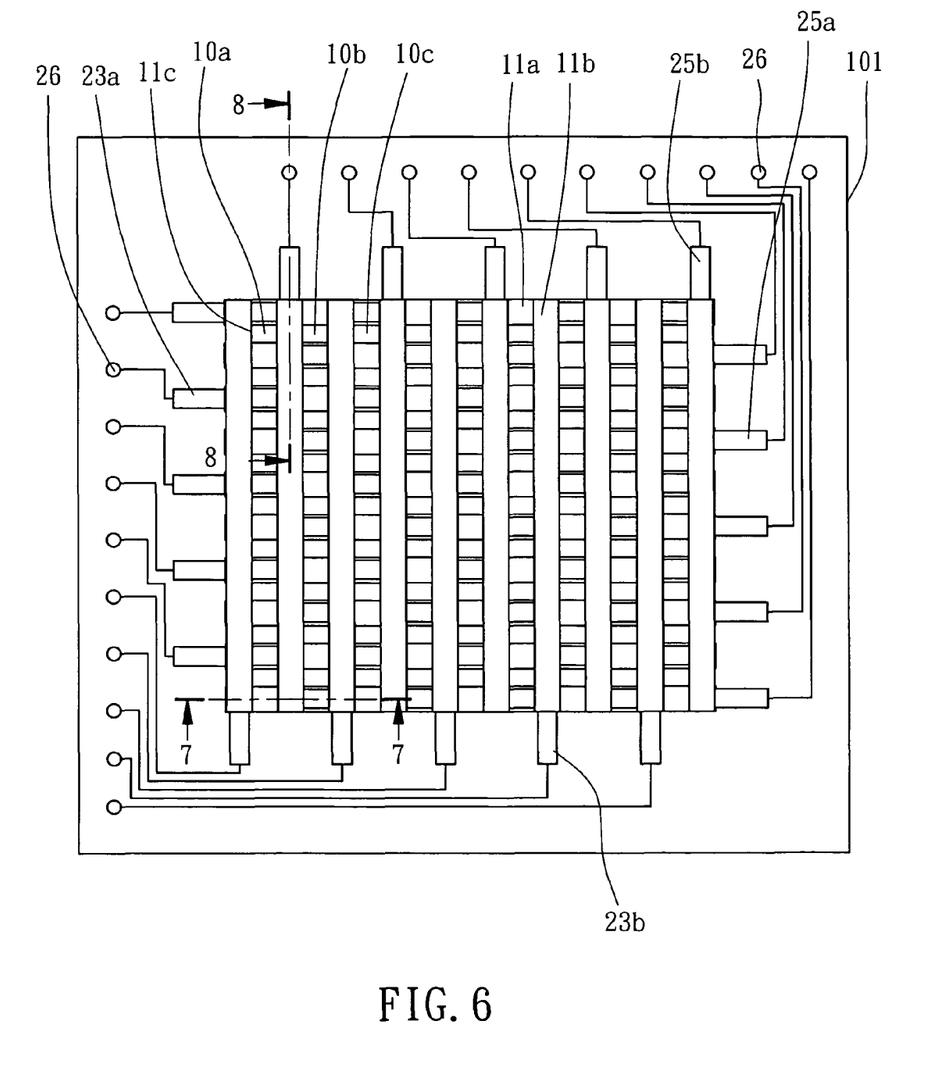
FIG. 6 is another schematic view of the preferred embodiment of the present invention, illustrating that second masking elements are covered on the second patterned electrode layer

Referring to FIG. 6, the color filter 10 includes a plurality of red, green, and blue filter units 10a, 10b, and 10c and a black matrix (BM) 11. The BM 11 is made of insulative black resin, having a plurality of first-direction (transversal) first masking elements 11a and a plurality of longitudinal second masking elements 11b. The first and second masking elements 11a and 11b are interlaced with each other to define a plurality of insulated sections 11c for mounting the red, green, and blue filter units 10a, 10b, and 10c therein. In this embodiment, the touch signal transmission circuit 20 is prepared as well as the BM 11 on an inner side of the upper substrate 101 before the filter units 10a, 10b, and 10c are prepared.

Figure 2:
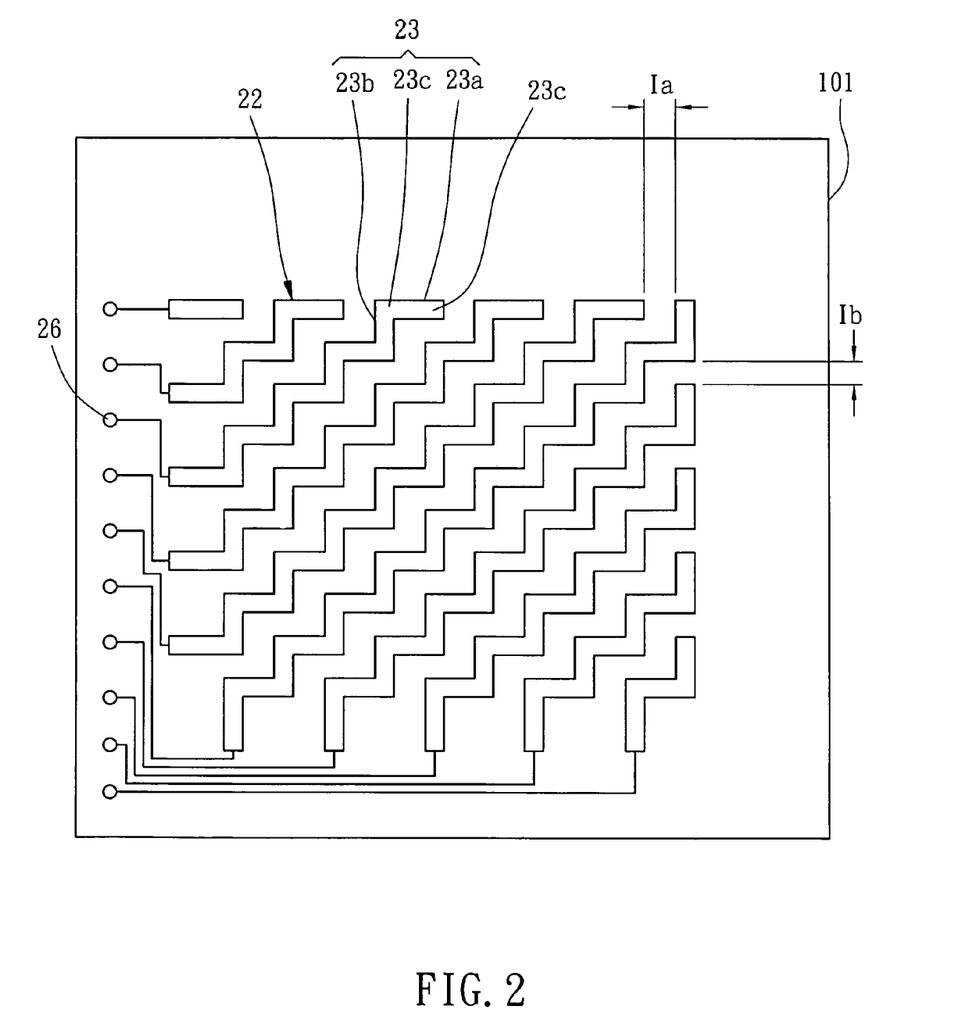
FIG. 2 is a schematic view of the preferred embodiment of the present invention, showing arrangement of a first patterned electrode layer.
Figure 3:
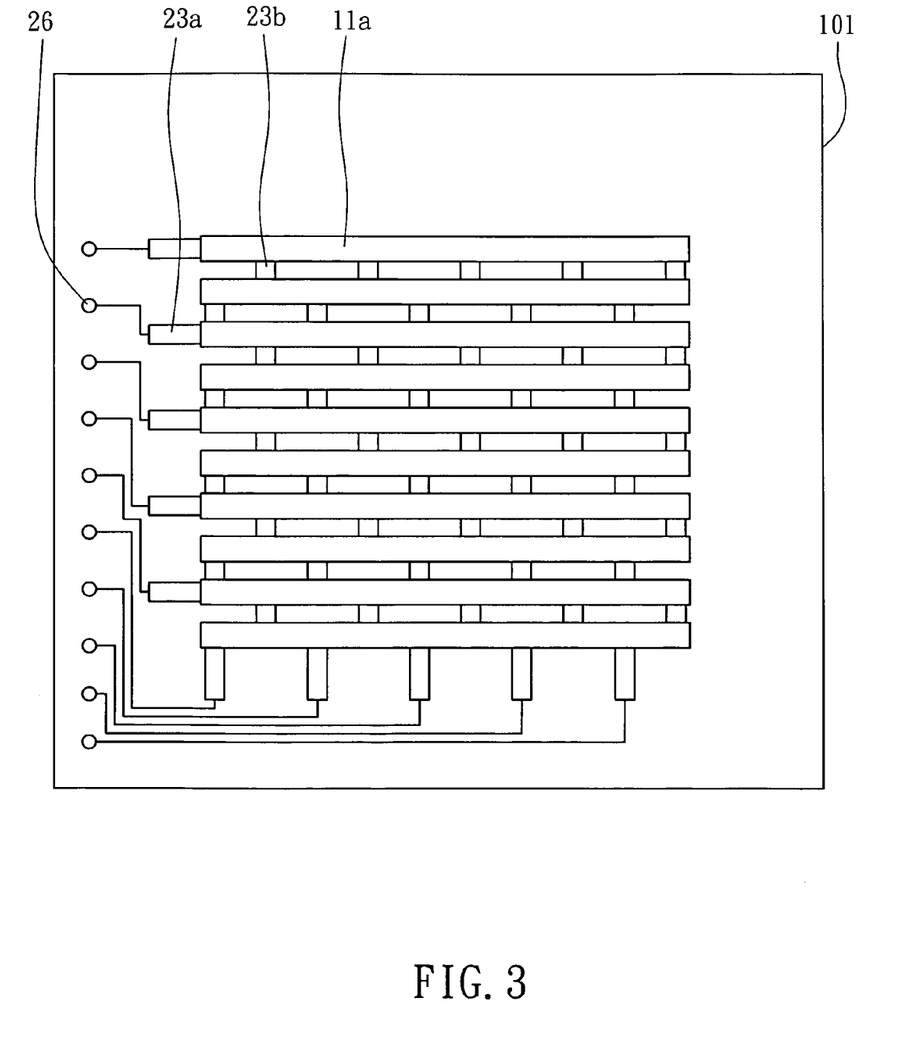
FIG. 3 is another schematic view of the preferred embodiment of the present invention, illustrating that a first masking element is covered on the first patterned electrode layer.
Figure 4A:
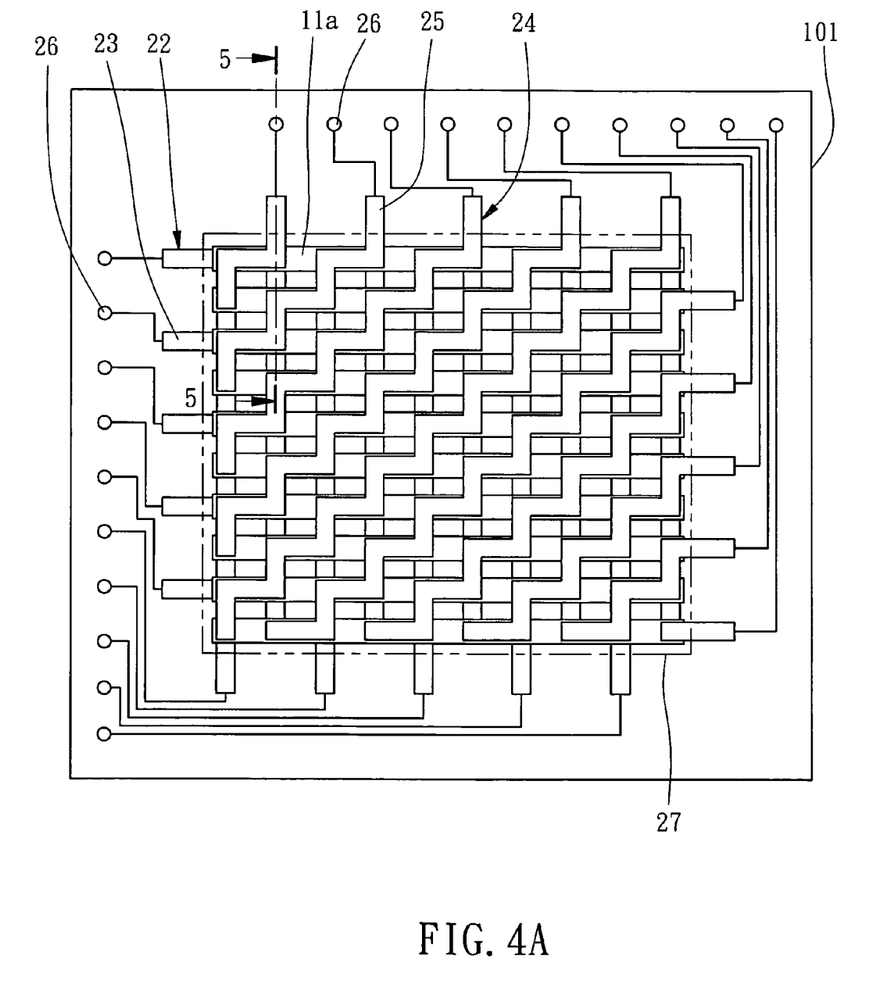
FIG. 4A is another schematic view of the preferred embodiment of the present invention, illustrating that the second patterned electrode layer is prepared on the first masking elements.
Figure 4B:
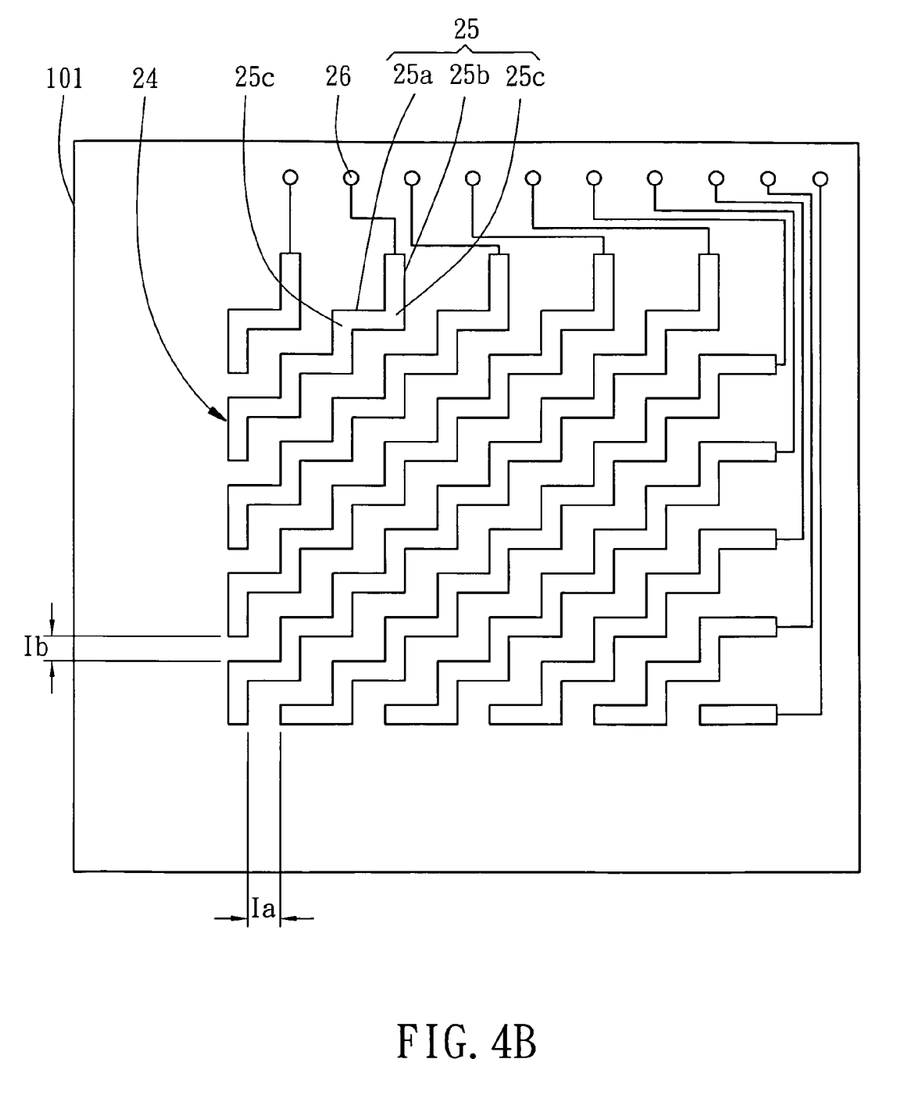
FIG. 4B is another schematic view of the preferred embodiment of the present invention, showing arrangement of the second patterned electrode layer.

Referring to FIGS. 2 and 4, the touch signal transmission circuit 20 includes a first patterned electrode layer 22 and a second patterned electrode layer 24. The first patterned electrode layer 22 includes a plurality of first electrodes 23 arranged in apposition, each of which is composed of a plurality of first-direction portions 23a and a plurality of second-direction portions 23b. The first-direction and second-direction portions 23a and 23b are alternately connected with one other to be shaped like footsteps. The first direction is perpendicular to the second direction, as shown in FIG. 2. Each of the first electrodes 23 has an orientation from upper right toward lower left, having a plurality of upper contact points 23c, each of which is defined at where the first-direction portion 23a is connected with the second-direction portion 23b. Each of the first electrodes 23 has two ends, one of which is electrically connected with a bonding pad 26 and the other is defined as an upper contact point 23c. A first-direction (transversal) interval $I_a$ defined between each two adjacent first electrodes 23 is equal to a second-direction (longitudinal) interval $I_b$ defined between each two adjacent first electrodes 23. In this embodiment, the first-direction interval $I_a$ is not equal to the second-direction interval $I_b$. As shown in FIG. 3, the first masking elements 11a of the BM 11 are prepared, the first masking elements 11a cover major parts of the first-direction portions 23a of the first patterned electrode layer 23, and the second-direction portions 23b are exposed.

Figure 5:
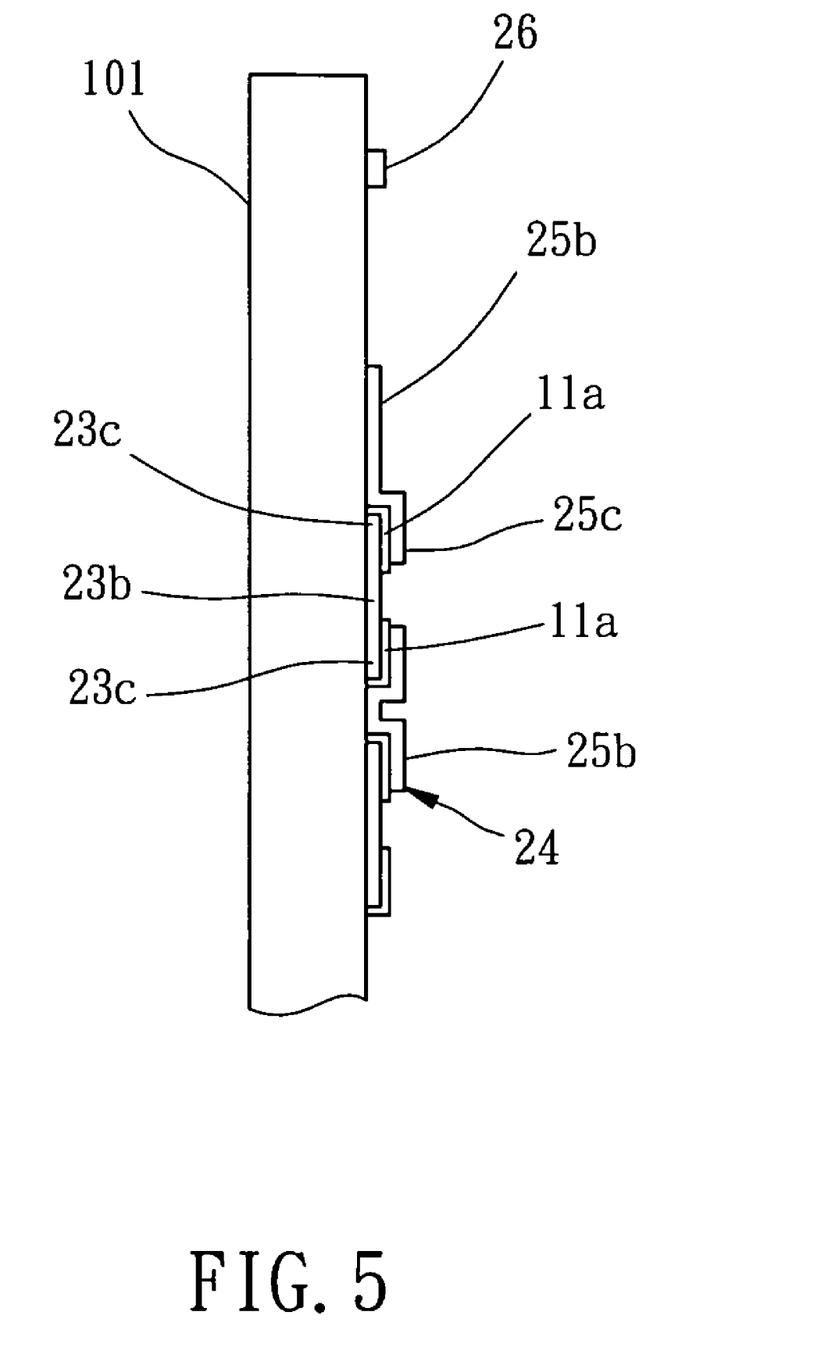
FIG. 5 is a sectional view taken along a ling 5-5 indicated in FIG. 4.

Referring to FIGS. 4A & 4B and FIG. 5, a second patterned electrode layer 24 (FIG. 4B) is prepared above the first patterned electrode layer 23 and the first masking elements 11a. The first and second patterned electrode layers 23 and 24 partially vertically overlap each other to define a rectangular touch control section 27. The second patterned electrode layer 24 includes a plurality of second electrodes 25 arranged in apposition, each of which is composed of a plurality of first-direction portions 25a and a plurality of second-direction portions 25b. The first-direction and second-direction portions 25a and 25b are alternately connected with one another to be shaped like the footsteps. Each of the second electrodes 25 has an orientation from upper right toward lower left, having a plurality of lower contact points 25c, each of which is defined at where the first-direction portion 25a is connected with the second-direction portion 25b. Each of the second electrodes 25 has two ends, one of which is electrically connected with another bonding pad 26 and the other is defined as one of the lower contact points 25c. As shown in FIG. 4B, a first-direction interval $I_a$ defined between each two adjacent second electrodes 25 is equal to a second-direction interval $I_b$ defined between each two adjacent second electrodes 25. In this embodiment, the first-direction interval $I_a$ is not equal to the second-direction interval $I_b$.

Figure 7:
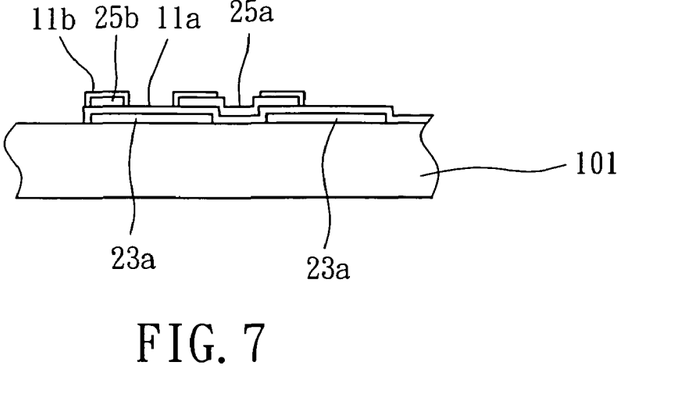
FIG. 7 is a sectional view taken along a ling 7-7 indicated in FIG. 6.
Figure 8:
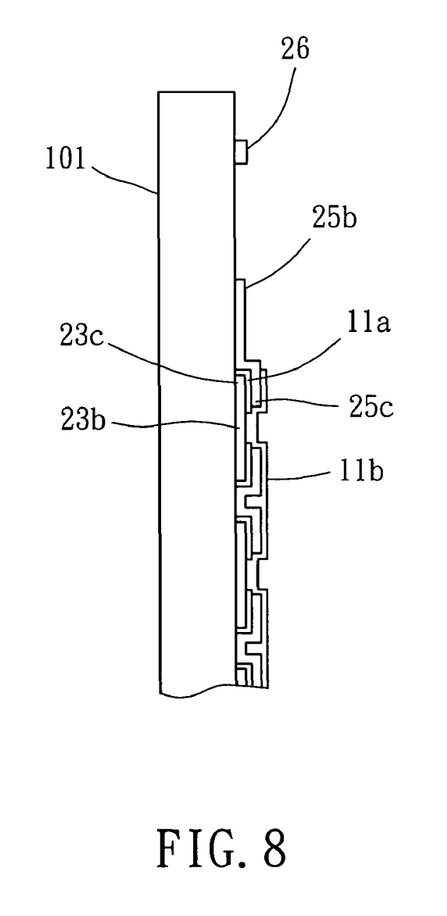
FIG. 8 is a sectional view taken along a ling 8-8 indicated in FIG. 6.

It is to be noted that each of the second electrodes 25 is interlaced with the adjacent one of the first electrodes 23 in such a way that there are intervals among them in this embodiment, wherein the interval is defined as each of the insulated sections 11c. In other words, the first-direction portions 25a of the second electrode 25 though partially overlap the first-direction portions 23a of the first electrodes 23, but the first masking elements 11a are located between them, such that the first-direction portions 23a and 25a are electrically insulated from each other. The second-direction portions 25b of the second electrodes 25 are spaced from the second-direction portions 23b of the first electrodes 23, such that the second-direction portions 23b and 25b are electrically insulated from each other. Such design enables that each of the lower contact points 25c right vertically corresponds to one of the upper contact points 23c. In this way, a plurality of touch-sensitive points are formed. Finally, the first and second masking elements 11a and 11b of the BM 11 are prepared to jointly cover all of the first-direction and second-direction portions 23a, 25a, 23b, and 25b of the first and second patterned electrode layers 22 and 24 formed in the touch control section 27, or only the second masking elements 11b of the BM 11 are prepared to cover all of the second-direction portions 23b and 25b of the first and second patterned electrode layers 22 and 24 formed in the touch control section 27. FIGS. 6-8 show the finally prepared touch signal transmission circuit 30 and BM 11.

In light of the above, the first masking elements 11a jointly constitute such an insulative layer that the second patterned electrode layer 24 is formed above the first patterned electrode layer 22 by electric insulation therebetween.

As known from the above, the present will become the capacitive element of the touch control, i.e. the first and second electrodes 23 and 25 are prepared in the shape of the footsteps, such that only fewer electrodes are needed to cover the whole touch control section. In this way, the number of the bonding pads can be decreased as well as the number of the pins of the touch control IC, such that the production cost of the LCD can be effectively reduced. Besides, the touch signal transmission circuit 20 of the present invention is mounted to the inner side of the upper substrate 101 of the LCD and then it is not necessary to additionally install a touch control panel on the upper substrate 101, such that the thickness and weight of the whole LCD can be improved.

In addition, if the BM 11 in the aforementioned embodiment needs to be made of conductive material subject to the requirement of special display design, two insulative layers can be mounted respectively between the first electrodes 23 and the first masking elements 11a and between the second electrodes 25 and the second masking elements 11b.

Although the present invention has been described with respect to a specific preferred embodiment thereof, it is no way limited to the details of the illustrated structures but changes and modifications may be made within the scope of the appended claims.

What is claimed is:

1. A touch signal transmission circuit for a touch control display, said touch signal transmission circuit being mounted to an inner side of an upper substrate of a liquid crystal display (LCD), said touch signal transmission circuit comprising:
   a first patterned electrode layer having a plurality of first electrodes arranged in apposition, said first electrodes having an inclined orientation in the shape of footsteps, each of said first electrodes having a upper contact point defined at each of tunings of the footsteps; and
   a second patterned electrode layer formed on said first patterned electrode layer by electric insulation therebetween, said second and first patterned electrode layers overlapping each other to define a touch control section, said second patterned electrode layer having a plurality of second electrodes arranged in apposition, said second electrodes having the same inclined orientation as the first electrodes do and in the shape of footsteps, each of said second electrodes having a lower contact point defined at each of tunings of the footsteps and right corresponding to one of said upper contact points, each of said second electrodes being interlaced with one of said first electrodes.

2. The touch signal transmission circuit for a touch control display as defined in claim 1, wherein each of said electrodes of said first patterned electrode layer comprises a plurality of first-direction portions and a plurality of second-direction portions, said first-direction and second-direction portions being alternately connected with one another; said upper contact points being located at where said first-direction and second-direction portions are connected.

3. The touch signal transmission circuit for a touch control display as defined in claim 2, wherein a first-direction interval defined between each two adjacent first or second electrodes is equal to a second-direction interval defined between each two adjacent first or second electrodes.

4. The touch signal transmission circuit for a touch control display as defined in claim 2, wherein a first-direction interval defined between each two adjacent first or second electrodes is not equal to a second-direction interval defined between each two adjacent first or second electrodes.

5. The touch signal transmission circuit for a touch control display as defined in claim 2 further comprising an insulative layer, wherein said insulative layer is located between said first and second patterned electrode layers.

6. The touch signal transmission circuit for a touch control display as defined in claim 5, wherein said upper substrate of said LCD further comprises a color filter disposed at an inner side thereof, said color filter having a plurality of filter units and a black matrix, said black matrix having a plurality of first-direction first masking elements and a plurality of second-direction second masking elements, said first masking elements covering all of said first-direction portions located in said touch control section, said first masking elements jointly constituting said insulative layer, said second masking elements covering all of said second-direction electrodes of said first and second patterned electrode layers.

7. The touch signal transmission circuit for a touch control display as defined in claim 6, wherein said first masking elements further cover all of said first-direction electrodes of said second patterned electrode layer located in said touch control section.

8. The touch signal transmission circuit for a touch control display as defined in claim 3, wherein said insulative layer is made of transparent material.

* * * * *